(12) United States Patent
Hayakawa

(10) Patent No.: US 8,552,648 B2
(45) Date of Patent: Oct. 8, 2013

(54) VEHICLE HEADLAMP APPARATUS

(75) Inventor: Michihiko Hayakawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1145 days.

(21) Appl. No.: 12/487,714

(22) Filed: Jun. 19, 2009

(65) Prior Publication Data
US 2009/0315479 A1    Dec. 24, 2009

(30) Foreign Application Priority Data
Jun. 20, 2008 (JP) ................................. 2008-162583

(51) Int. Cl.
*B60Q 1/02* (2006.01)
*B60Q 1/26* (2006.01)

(52) U.S. Cl.
USPC .............................. 315/82; 315/80

(58) Field of Classification Search
USPC .............. 315/76, 77, 78, 79, 80, 82; 362/487, 362/459, 460, 465, 467–468, 518, 523, 538
See application file for complete search history.

(56) References Cited

U.S. PATENT DOCUMENTS

| | | | |
|---|---|---|---|
| 6,343,869 B1 * | 2/2002 | Kobayashi | 362/37 |
| 6,817,740 B2 * | 11/2004 | Kobayashi et al. | 362/466 |
| 7,090,385 B2 * | 8/2006 | Sugimoto | 362/539 |
| 7,168,832 B2 * | 1/2007 | Komatsu et al. | 362/507 |
| 7,204,620 B2 * | 4/2007 | Yamamoto et al. | 362/465 |
| 7,364,332 B2 * | 4/2008 | Komatsu et al. | 362/522 |
| 7,500,773 B2 * | 3/2009 | Komatsu | 362/545 |
| 8,007,146 B2 * | 8/2011 | Tatara et al. | 362/464 |
| 2004/0189447 A1 | 9/2004 | Okubo et al. | |
| 2007/0091629 A1 * | 4/2007 | Fukawa | 362/509 |
| 2007/0147055 A1 | 6/2007 | Komatsu | |

FOREIGN PATENT DOCUMENTS

| | | |
|---|---|---|
| CN | 101008481 A1 | 8/2007 |
| JP | 2003-123514 A | 4/2003 |

OTHER PUBLICATIONS

Chinese Office Action dated Jun. 29, 2011 in corresponding Chinese Patent Application No. 200910147293.5.

* cited by examiner

*Primary Examiner* — Minh D A
(74) *Attorney, Agent, or Firm* — Sughrue Mion, PLLC

(57) ABSTRACT

A vehicle headlamp apparatus is provided. The vehicle headlamp apparatus includes right and left headlamps, and a controller which controls the right and left headlamps. Each of the right and left headlamps is configured to produce a low beam light distribution pattern having a horizontal cutoff line to irradiate a region in front the vehicle headlamp apparatus, and is operable to selectively produce one or both of a right side auxiliary light distribution pattern above a right part of the horizontal cutoff line and a left side auxiliary light distribution pattern above a left part of the horizontal cutoff line. Based on a position of a forward vehicle ahead of the vehicle headlamp apparatus, the controller controls each of the right and left headlamps to produce one or both of the right side auxiliary light distribution pattern and the left side auxiliary light distribution pattern.

17 Claims, 13 Drawing Sheets

FIG. 4

| LIGHT DISTRIBUTION PATTERN ON VIRTUAL SCREEN | LEFT SHADE SECTION | RIGHT SHADE SECTION |
|---|---|---|
| LEFT SIDE HIGH BEAM | UPRIGHT | TILT |
| RIGHT SIDE HIGH BEAM | TILT | UPRIGHT |
| LOW BEAM | UPRIGHT | UPRIGHT |
| FULL HIGH BEAM | TILT | TILT |

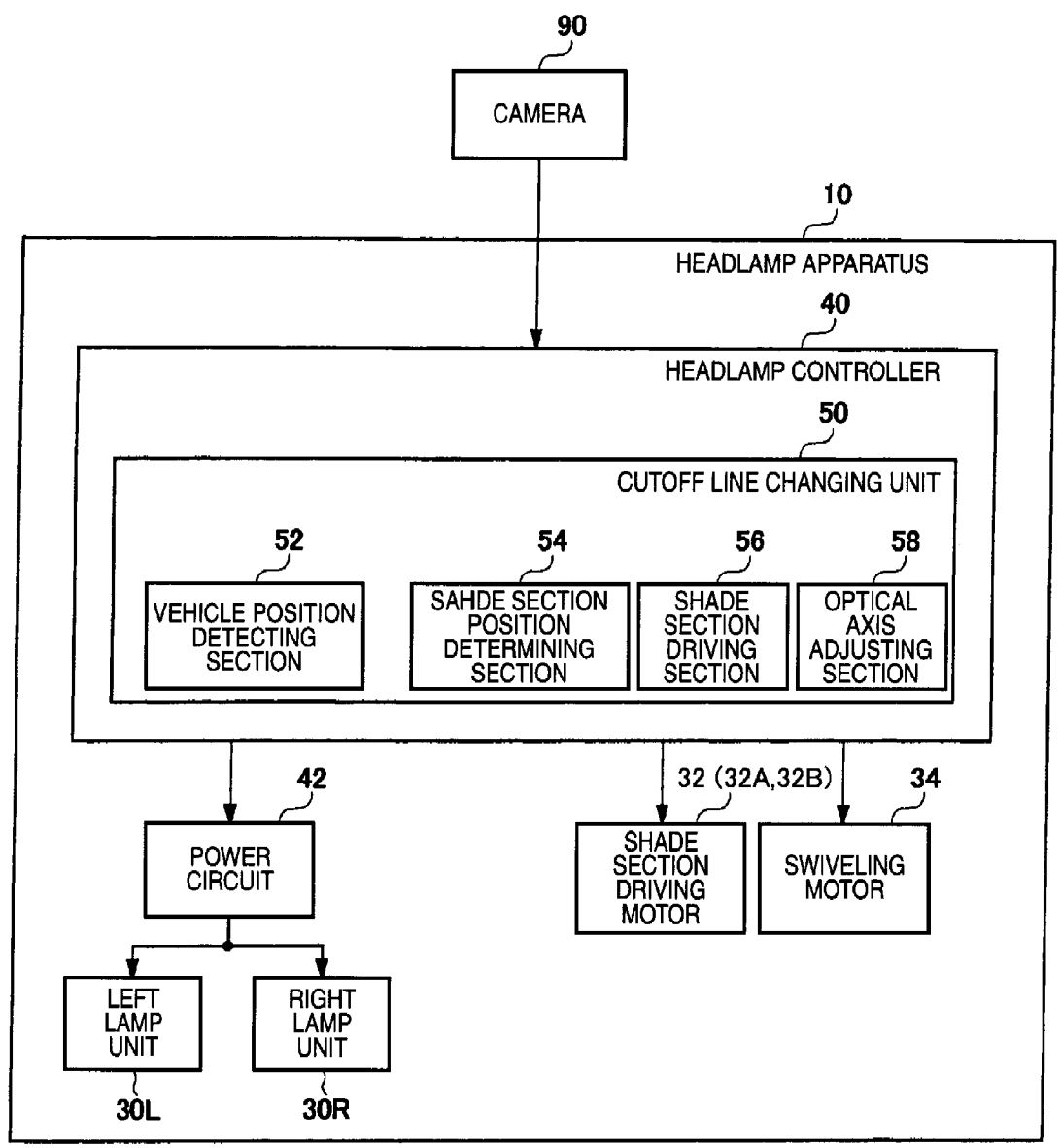

US 8,552,648 B2

VEHICLE HEADLAMP APPARATUS

CROSS-REFERENCE TO RELATED APPLICATION

The present application claims priority from Japanese Patent Application No. 2008-162583 filed on Jun. 20, 2008, the entire content of which is incorporated herein by reference.

FIELD OF INVENTION

Apparatuses consistent with the present invention relate to a headlamp apparatus for a vehicle such as an automobile.

DESCRIPTION OF RELATED ART

In related art headlamp apparatuses, a light distribution pattern is switchable between a low beam and a high beam. The low beam is for irradiating a near region, and is often used when driving in a city area. A light distribution of the low beam is regulated so as not to give glare to an oncoming vehicle or a vehicle traveling in the same direction and in front of the vehicle (i.e., a preceding vehicle). The high beam is for irradiating a wide range of regions ahead of the headlamp apparatus, including a distant region, with a relatively high illuminance, and is often used when driving at a high speed on a road with few oncoming vehicles or preceding vehicles.

In order to improve visibility of a road surface in a region ahead of a vehicle during a cornering for example, a related art headlamp apparatus includes a lamp unit which is supported so as to be rotatable in right-and-left or up-and-down directions and is controlled to rotate in accordance with a driving condition of the vehicle (see, e.g., JP 2003-123514 A). That is, by changing a direction of an irradiation beam from the lamp unit, a light distribution pattern of the irradiation beam can be adapted to the driving condition of the vehicle.

The high beam is superior to the low beam in terms of its high visibility, but gives a glare to a driver of an oncoming vehicle and/or a preceding vehicle (hereinafter "forward vehicle"). If the direction of the irradiation beam is changed to avoid the forward vehicle using the related art headlamp apparatus, however; the road surface ahead of the vehicle cannot sufficiently be irradiated, resulting in a deterioration of visibility.

SUMMARY OF INVENTION

Illustrative aspects of the present invention provide a vehicle headlamp apparatus in which visibility of a road surface in a region ahead of the vehicle is improved without giving a glare to a driver of a forward vehicle.

According to an illustrative aspect of the present invention, a vehicle headlamp apparatus is provided. The vehicle headlamp apparatus includes a right headlamp, a left headlamp, and a controller which controls the right and left headlamps. Each of the right and left headlamps is configured to produce a low beam light distribution pattern having a horizontal cutoff line to irradiate a region in front the vehicle headlamp apparatus, and is operable to selectively produce one or both of a right side auxiliary light distribution pattern above a right part of the horizontal cutoff line and a left side auxiliary light distribution pattern above a left part of the horizontal cutoff line. The controller includes a vehicle position detecting section which detects a position of a forward vehicle ahead of the vehicle headlamp apparatus. Based on the position of the forward vehicle, the controller controls each of the right and left headlamps to produce one or both of the right side auxiliary light distribution pattern and the left side auxiliary light distribution pattern.

Other aspects and advantages of the invention will be apparent from the following description, the drawings and the claims.

BRIEF DESCRIPTION OF THE DRAWINGS

FIG. 4 is a table showing combinations of orientations of right and left shade sections and light distribution patterns produced by the respective combinations;

FIG. 6 is a functional block diagram of an overall configuration of the headlamp apparatus of FIG. 1;

DETAILED DESCRIPTION OF EXEMPLARY EMBODIMENTS OF INVENTION

Hereinafter, exemplary embodiments of the present invention will be explained in detail with reference to the drawings. The following exemplary embodiments are examples only and do not limit the scope of the present invention as defined by the claims.

First Exemplary Embodiment

Figure 1:
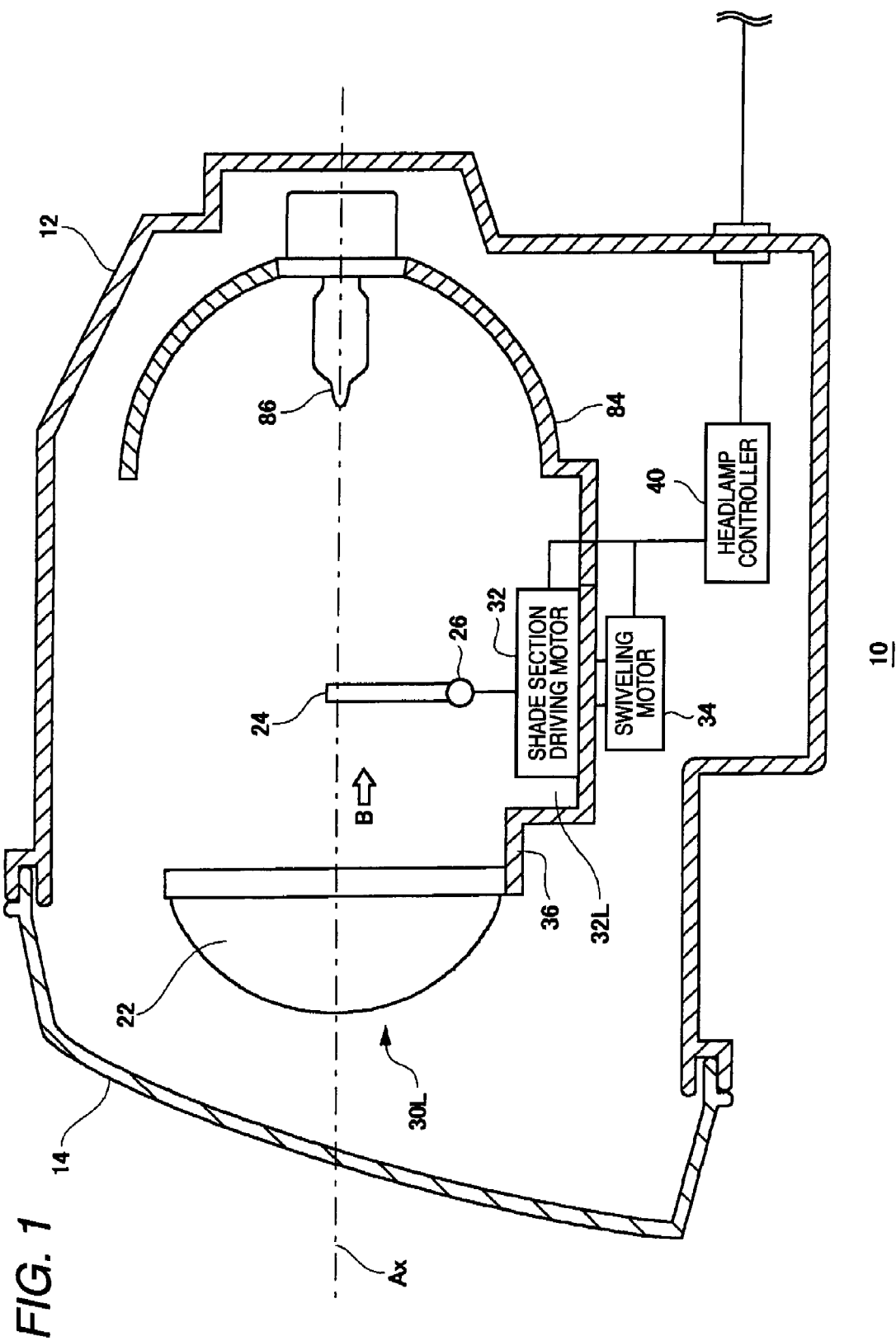
FIG. 1 is a schematic vertical sectional view of a headlamp apparatus according to a first exemplary embodiment of the present invention.

FIG. 1 is a schematic vertical sectional view of a headlamp apparatus 10 according to a first exemplary embodiment of the present invention. The headlamp apparatus 10 includes a left headlamp which is arranged at a left front end portion of a vehicle body and a right lamp which is arranged at a right front end portion of the vehicle body. FIG. 1 illustrates the left headlamp of the headlamp apparatus 10. In the following description, a configuration of the left headlamp will be described in detail. Because a configuration of the right headlamp is basically the same as the configuration of the left headlamp, detailed description of the configuration of the right headlamp will be omitted.

As shown in FIG. 1, the left headlamp includes a lamp body 12, a transparent cover 14 attached to a front opening part of the lamp body 12, and a left lamp unit 30L accommodated in a lamp chamber defined by the lamp body 12 and the transparent cover 14. The left lamp unit 30L is attached to the lamp body 12 via a support member (not shown).

The left lamp unit 30L is a projector-type lamp unit. The left lamp unit 30L includes a light source 86, a reflector 84, a projection lens 22, and a shade 24. A light emitted from the light source 86 is forwardly reflected by the reflector 84. A part of the light reflected by the reflector 84 can be shielded by the shade 24, thereby projecting, on a virtual vertical screen disposed ahead of the headlamp apparatus 10, a light distribution pattern having a cutoff line.

The reflector 84 has an ellipsoidal reflecting surface whose central axis coincides with an optical axis Ax of the left lamp unit 30L. The optical axis Ax extends in a front-and-rear direction of a vehicle on which the headlamp apparatus 10 is mounted. The reflecting surface of the reflector 84 is configured such that a sectional shape thereof taken along a plane including the optical Ax is elliptic and such that an eccentricity of the elliptic shape gradually increases from a vertical section toward a horizontal section. The light source 86 is disposed at a first focal point of the elliptic shape of the vertical section of the reflecting surface, so that the light emitted from the light source is converged at a second focal point of the elliptic shape.

The projection lens 22 is a planoconvex aspherical lens having a convex front surface and a flat rear surface, and is disposed on the optical axis Ax. The projection lens 22 is disposed such that a rear focal point thereof coincides with the second focal point of the reflecting surface of the reflector 84, and is configured to project an image along a rear focal plane thereof onto the virtual vertical screen as an inverted image. A peripheral edge of the projection lens 22 is held by a front-end annular groove of a holder 36.

As the light source, for example, an incandescent lamp, a halogen lamp, a discharge lamp or an LED (Light Emitting Diode) may be used. In this exemplary embodiment, the light source 86 is illustrated as a halogen lamp. The light source 86 is fitted and secured to an opening portion formed substantially at a center the reflector 84, and is supported by the lamp body 12.

The headlamp apparatus 10 is a switchable-type headlamp apparatus. More specifically, each of the right and left lamp units 30R, 30L can selectively produce a low beam light distribution pattern and a high beam light distribution pattern by using the movable shade 24.

The shade 24 can shield a part of the light emitted from the light source 86 so as to form the low beam light distribution pattern. The shade 24 is divided into two shade sections 24a, 24b (see FIG. 2). A rotating part 26 is attached to a lower end of each of the shade sections 24a, 24b. The rotating part 26 is rotated by a shade section driving motor 32. When both of the shade sections 24a, 24b are upright, the low beam light distribution pattern is formed. When the rotating part 26 is rotated such that both of the shade sections 24a, 24b are tilted down so as to be oriented in a substantially horizontal direction, the high beam light distribution pattern is formed. Detailed configuration and functions of the shade 24 will be described below with reference to FIG. 2.

The left headlamp further includes a swiveling motor 34 which changes an angle of the optical axis Ax of the left lamp unit 30L in accordance with a command from a headlamp controller 40. The left lamp unit 30L is supported by the lamp body 12 so as to be rotatable at least in a horizontal direction. The swiveling motor 34 is attached to a bottom portion of the holder 36 such that the entire lamp unit 30L is swivelable in the horizontal direction around a vertical axis.

Figure 2:
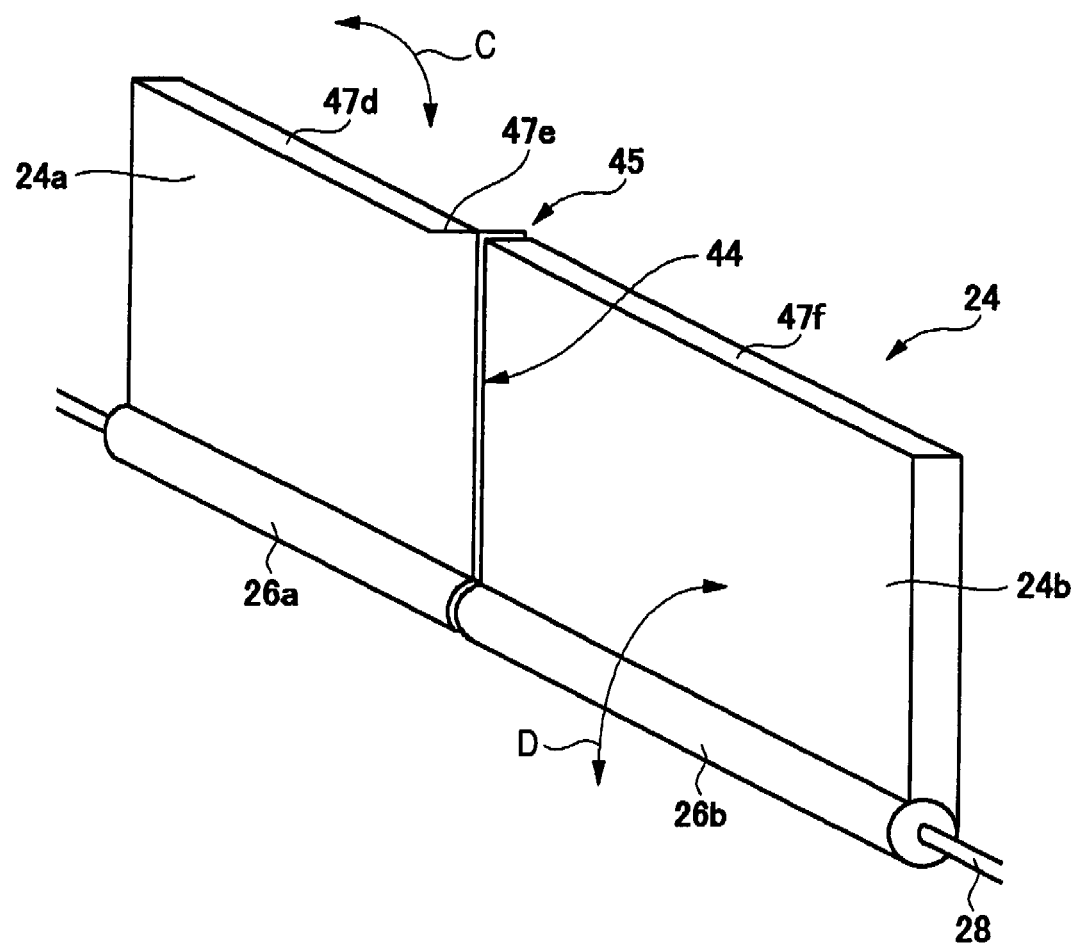
FIG. 2 is a schematic perspective view of a shade shown in FIG. 1.

FIG. 2 is a schematic perspective of the shade 24. As described above, the shade 24 is divided into two shade sections 24a, 24b, namely a right shade section 24a and a left shade section 24b, along a dividing slit 44 which passes through an elbow point 45. In order to form the cutoff line of the low beam light distribution pattern, the shade sections 24a, 24b are configured to have a right portion 47d, a left portion 47f disposed to the left of the right portion 47d in a widthwise direction of the vehicle, and a central portion 47e which is extends obliquely upward from the right portion 47d toward the left portion 47f. (see, e.g., FIG. 3A). The right portion 47d extends in the horizontal direction at a location below a horizontal line intersecting the optical axis Ax. The left portion 47f extends also in the horizontal direction but at a location slightly above the right portion 47d. The central portion 47e extends upward at an angle of, for example, about 45° with respect to the horizontal direction.

Each of the lower ends of the shade sections 24a, 24b is attached to a corresponding rotating part 26a, 26b. The rotating parts 26a, 26b are rotatably supported by a support shaft 28. The support shaft 28 is coupled to a side wall (not shown) extending from the holder 36 so as to be swivelable together with the holder 36. Each of the rotating parts 26a, 26b is coupled to a drive shaft of a corresponding shade section driving motor 32a, 32b (see FIG. 6) via a transmission mechanism (not shown) including such components as a gear, a belt or a chain, etc. Thus, in accordance with a command of a headlamp controller 40, each of the rotating parts 26a, 26b is independently rotatable.

According to another exemplary embodiment, each of the rotating parts 26a, 26b may include a motor therein so that each of the rotating parts 26a, 26b can be independently self-rotated about the support shaft 28 in accordance with a command of the headlamp controller 40.

According to still another exemplary embodiment, a front surface or a rear surface of each of the shade sections 24a, 24b may be coupled to a drive shaft of a corresponding solenoid. In this case, when the solenoid is activated in accordance with a command from the headlamp controller 40, the drive shaft is projected to open the corresponding shade section 24a, 24b, and when the solenoid is deactivated, the drive shaft is retracted to pull the corresponding shade section 24a, 24b to be in an upright orientation.

According to still another exemplary embodiment, a rotary shade may be provided instead of the shade 24. The rotary shade has a rotary shaft and a plurality of shade sections, each having a different shielding area, attached to a circumferential surface of the rotary shaft at intervals along a circumferential direction of the rotary shaft. In this case, at least two of the plurality of shade sections are configured to shield the same amount of light as the shade sections 24a, 24b described above. By rotating the rotary shaft of the rotary shade such that a distal end of one of the shade sections is located at or near the second focal point of the reflector 84, it is possible to form a similar light distribution pattern as the light distribution pattern formed by the shade sections 24a, 24b.

While the left lamp unit 30L has been described in detail, the right lamp unit 30R has a similar configuration as that of the left lamp unit 30L.

Figure 3A:
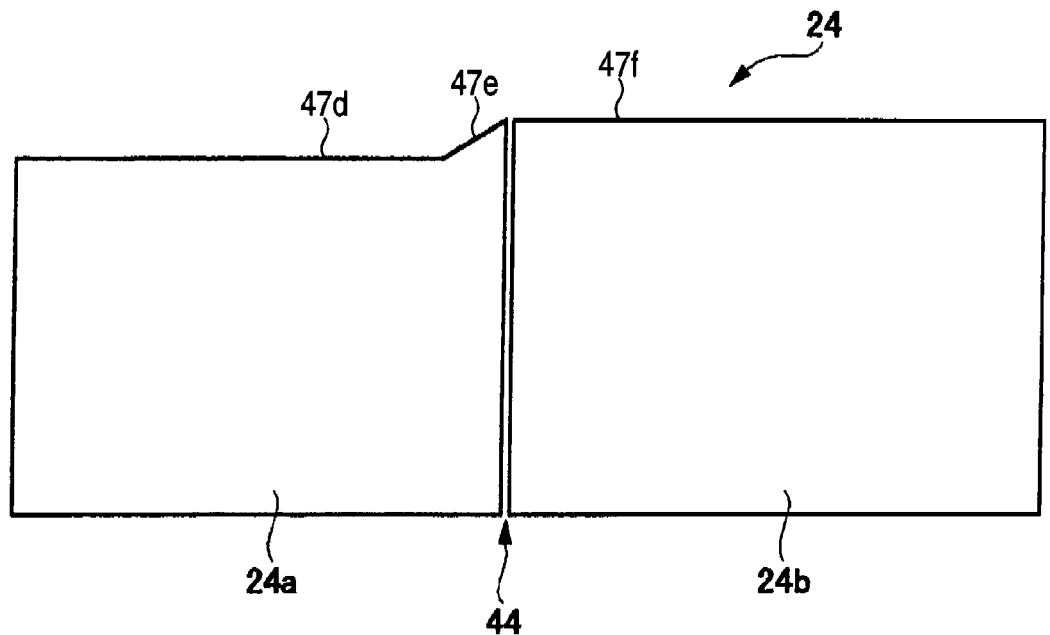
FIG. 3A is a front view of the shade when viewed from a point B shown in FIG. 1.
Figure 3B:
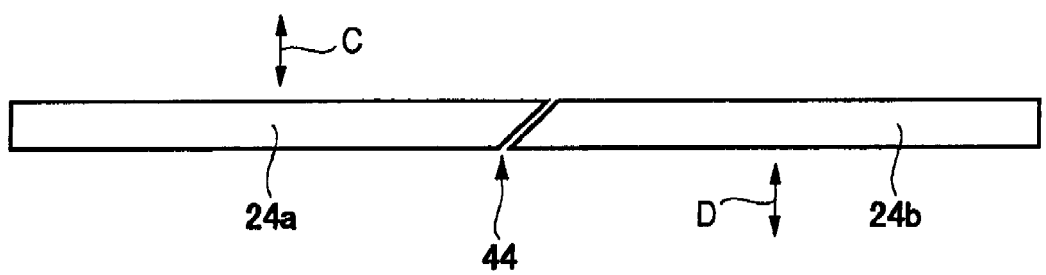
FIG. 3B is a top view of the shade, illustrating an example of a dividing slit.

FIG. 3A is a front view of the shade 24 seen from a point B shown in FIG. 1, and FIG. 3B is a top view thereof. As shown in FIG. 3B, the dividing slit 44 between the shade sections 24a, 24b may be formed to obliquely extend in the front-and-rear direction with respect to the front surface of the shade 24. In other words, the dividing slit 44 may be formed so as not to meet the front surface of the shade 24 at right angles. According to this configuration, the shade sections 24a, 24b overlap with each other, on respective sides of the dividing slit 44, in the direction along which the optical axis Ax extends. Therefore, when the shade sections 24a, 24b are upright, the light from the light source 86 is prevented from leaking toward a region in front of the shade sections 24a, 24b.

As long as the shade sections 24a, 24b overlap with each other, on respective sides of the dividing slit 44, in the direction along which the optical axis Ax extends so that the light is prevented from leaking, the dividing slit 44 does not necessarily need to be oblique, when seen in a top view, with respect to the front surface of the shade 24. For example, as shown in FIG. 3C, the dividing slit 44 may be formed in a stepped manner to provide overlapping portions of the shade sections 24a, 24b.

Figure 3C:
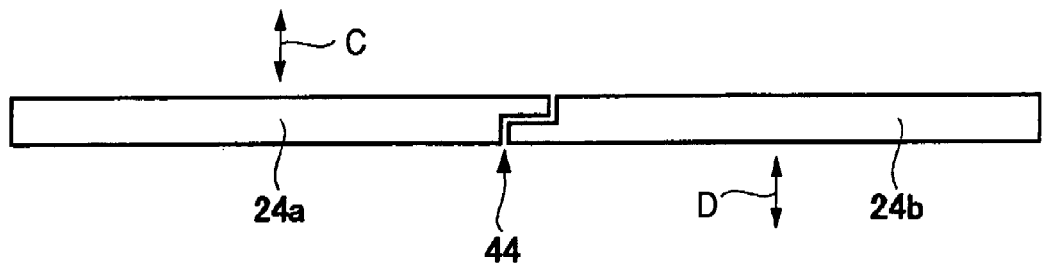
FIG. 3C is a top view of the shade, illustrating another example of the dividing slit.

In a case in which overlapping portions of the shade sections 24a, 24b are provided like in the examples shown in FIGS. 3B and 3C, the shade sections 24a, 24b are tilted down in opposite directions. In this exemplary embodiment, the shade section 24a is configured to be tilted toward the light source 86 (in direction C), and the shade section 24b is configured to be tilted toward the projection lens 22 (in direction D).

Figure 5B:
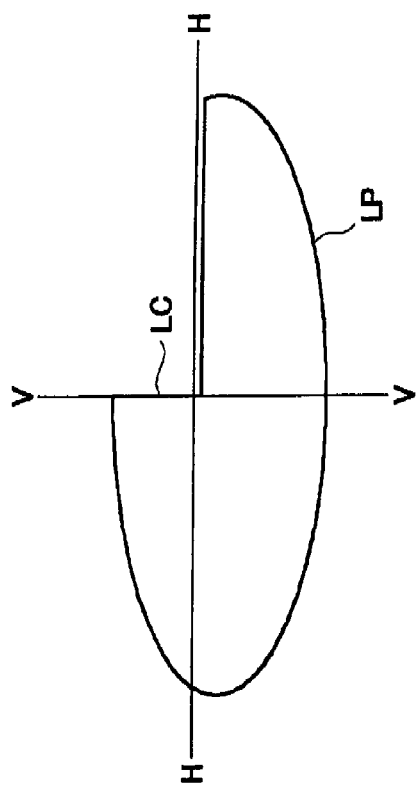
FIGS. 5A and 5B illustrate light distribution patterns which are formed on a virtual vertical screen disposed at a position ahead of the headlamp apparatus.
Figure 5A:
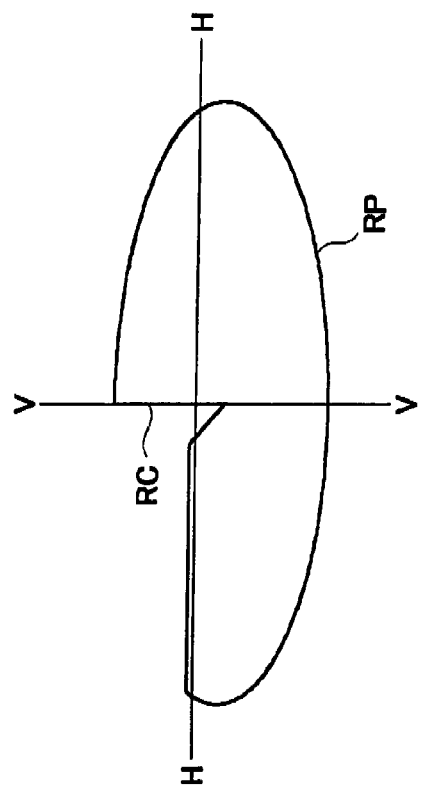

FIG. 4 is a table 100 showing combinations of orientations of the shade sections 24a, 24b (columns 104 and 106, respectively) and the light distribution patterns formed on a virtual screen in front of the vehicle produced by the respective combinations (column 102). Note in the following description that the projection lens 22 inverts the light in both a top-bottom and right-left direction. As described in FIG. 4, when the left shade section 24b is upright and the right shade section 24a is tilted, a left side high beam light distribution pattern shown in FIG. 5A is produced on the virtual screen. When the left shade section 24b is tilted and the right shade section 24a is upright, a right side high beam light distribution pattern shown in FIG. 5B is produced on the virtual screen. When both of the shade sections 24a, 24b are upright, the low beam light distribution pattern is produced on the virtual screen. When both of the shade sections 24a, 24b are tilted, a full high beam light distribution pattern (the normal high beam light distribution pattern) is produced on the virtual screen.

That is, when the left shade section 24b is tilted, a right side auxiliary light distribution pattern is produced above a right part of the horizontal cutoff line of the low beam light distribution pattern. When the right shade section 24a is tilted, a left side auxiliary light distribution pattern is produced above a left part of the horizontal cutoff line of the low beam light distribution pattern FIGS. 5A and 5B illustrate the light distribution patterns which are formed on the virtual vertical screen disposed, for example, 25 m ahead of the headlamp apparatus 10. As discussed above, because the planoconvex aspherical projection lens 22 is arranged in front of the shade 24 as shown in FIG. 1, it is to be noted that an image on the rear focal plane of the projection lens 22 is projected on the virtual vertical screen so as to be inverted in a vertical direction and in a transverse direction.

The left side high beam light distribution pattern shown in FIG. 5A has a shielded region (a non-irradiated region) on the right side of the vertical line V-V and above the horizontal line H-H, and a region on the left side of the vertical line V-V and above the cutoff line of the low beam light distribution pattern is irradiated. The right side high beam light distribution pattern shown in FIG. 5B has a shielded region on the left side of the vertical line V-V and above the horizontal line H-H, and a region on the right side of the vertical line V-V and above the cutoff line of the low beam light distribution pattern is irradiated. In the right side high beam light distribution pattern shown in FIG. 5B, due to the central oblique portion 47e of the right shade section 24a near the elbow point 45, the shielded region includes a region below the horizontal line H-H near an intersecting point of the vertical line V-V and the horizontal line H-H. A vertical cutoff line LC shown in FIG. 5A is formed by a side portion of the left shade section 24b adjacent to the dividing slit 44, and a vertical line RC shown in FIG. 5B is formed by a side portion of the right shade sections 24a adjacent to the dividing slit 44. When the lamp unit is not swiveled so that the optical axis Ax of the lamp unit is aligned with a straight-ahead direction, the vertical cutoff lines RC, LC coincide with the vertical line V-V as shown in FIGS. 5A and 5B.

FIG. 6 is a functional block diagram of an overall configuration of the headlamp apparatus 10. Each of the functional blocks illustrated in FIG. 6 can be implemented by means of hardware (e.g., a CPU, a memory device, an electric circuit and other mechanical devices) and/or software such as a computer program or the like. It is to be noted that those skilled on the art will understand that each of the functional blocks can be implemented in various ways by means of hardware and/or software.

The headlamp controller 40 controls on and off of the left lamp unit 30L and the right lamp unit 30R as well as the movements of the shade sections 24a, 24b provided in the respective lamp units. In accordance with a driver's operation of a headlamp switch (not shown), the headlamp controller 40 sends a command to a power circuit 42 so as to turn on or off of the left lamp unit 30L and the right lamp unit 30R.

A cutoff line changing unit 50 includes a vehicle position detecting section 52, a shade section position determining section 54, a shade section driving section 56, and an optical axis adjusting section 58.

The vehicle position detecting section 52 detects a position of a forward vehicle existing in a range in which a light distribution pattern can be produced, based on an image obtained by a CCD (Charge Coupled Device) camera 90 which is installed in the vehicle so as to capture an image of a region ahead of the vehicle. More specifically, the vehicle position detecting section 52 detects, within the image obtained by the camera 90, a portion corresponding to a headlamp or a tail lamp of the forward vehicle in accordance with a given algorithm, and compares the portion with the horizontal line H-H and the vertical line V-V to determine the position of the vehicle. The vehicle position data is output to the shade section position determining section 54. Because such a method for detecting a forward vehicle from an image captured by a camera is known in the art, detailed description thereof will be omitted. Instead of the camera 90, other detecting means such as a millimeter-wave radar or an infrared radar may be used to detect the position of the forward vehicle.

When the driver selects the low beam by operating the headlamp switch, the shade section position determining section 54 commands the shade section driving section 56 to move the shade sections 24a, 24b to upright positions using the shade section driving motors 32a, 32b, whereby the low beam light distribution pattern is produced. When the driver selects the high beam, the shade section position determining section 54 commands the shade section driving section 56 to tilt the shade sections 24a, 24b using the shade section driving motors 32a, 32b, whereby the high beam light distribution pattern is produced.

Moreover, when the vehicle position detecting section 52 detects a forward vehicle while the high beam is being selected by the driver, the shade section position determining section 54 determines which of the shade sections 24a, 24b to be moved to the upright position so as to produce a light distribution pattern having a shielded region corresponding to the detected position of the forward vehicle. That is, one of the left side high beam light distribution pattern or the right side high beam light distribution pattern is selected so as to provide a suitable shielded region that does not give glare to the forward vehicle.

More specifically, when an oncoming vehicle is detected by the vehicle position detecting section 52 but not a preceding vehicle, the shade section position determining section 54 causes the left lamp unit 30L and the right lamp unit 30R to produce the left side high beam light distribution pattern. When a preceding vehicle is detected by the vehicle position detecting section 52 but not an oncoming vehicle, the shade section position determining section causes the left lamp unit 30L and the right lamp unit 30R to produce the right side auxiliary light distribution pattern.

It is to be noted that, in this description, "the preceding vehicle" is a vehicle in front of the headlamp apparatus 10 and running in the same lane in the same direction as the vehicle, and "the oncoming vehicle" is a vehicle approaching the headlamp apparatus 10 from a region ahead of the headlamp apparatus 10 and running on an opposite-lane in an opposite direction as the vehicle. "The forward vehicle" is used as a generic term including the preceding vehicle and the oncoming vehicle.

The shade section driving section 56 sends a driving signal to the shade section driving motors 32a, 32b on the basis of the command from the shade section position determining section 54. The driving signal is transmitted to the shade section driving motors 32a, 32b of both of the left lamp unit 30L and the right lamp unit 30R.

The optical axis adjusting section 58 determines a direction of the optical axes Ax of the left lamp unit 30L and the right lamp unit 30R in accordance with the position of the forward vehicle detected by the vehicle position detecting section 52. More specifically, when there is a forward vehicle present, the optical axis adjusting section 58 determines the direction the optical axes Ax such that the vertical cutoff line LC of the left side high beam light distribution pattern is located slightly left of the forward vehicle or the vertical cutoff line RC of the right side high beam light distribution pattern is located slightly right of the forward vehicle. Further, the optical axis adjusting section 58 determines a swiveling angle of the lamp units that causes the optical axes Ax of the left lamp unit 30L and the right lamp unit 30R to be directed toward the determined direction, and sends a driving signal to the swiveling motors 34 in accordance with the swiveling angle.

Figure 7:
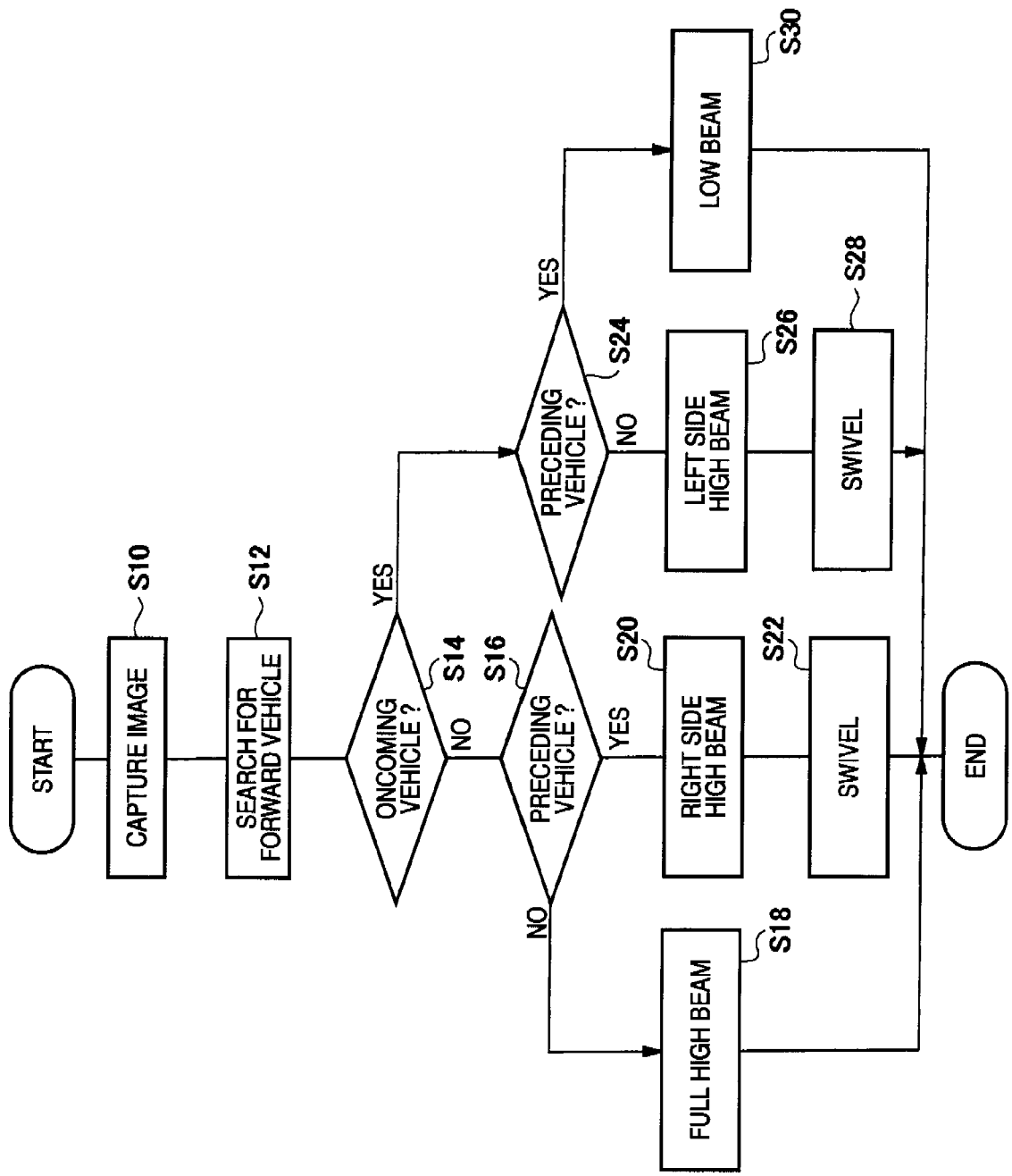
FIG. 7 is a flowchart of a light shielding control which is executed in accordance with a detected position of a forward vehicle.

FIG. 7 is a flowchart of a light shielding control which is executed in accordance with the detected position of the forward vehicle. While the high beam is being selected by the driver, the camera 90 captures an image of a region ahead of the vehicle (S10). The vehicle position detecting section 52 searches the captured image to detect a position of a forward vehicle within a range of the high beam light distribution pattern, more specifically, within a range of a portion of the high beam light distribution pattern above the horizontal line H-H (S12). Based on the search and the detection of the position of the forward vehicle, it is determined whether there is an oncoming vehicle (S14). If it is determined that there are no oncoming vehicles (S14; No), it is determined whether there is a preceding vehicle (S16). If it is determined that there is no preceding vehicle (S16; No), it is not necessary to worry about the glare because there are no forward vehicles. Therefore, the shade section position determining section 54 maintains the tilted condition of the shade sections 24a, 24b to irradiate the region ahead of the vehicle with the full high beam light distribution pattern (S18). In this case, the optical axis adjusting section 58 does not change the direction of the optical axes Ax.

If it is determined that there is a preceding vehicle in S16 (S 16; Yes), the shade section position determining section 54 causes the right shade section 24a to move to the upright position and maintains the tilted condition of the left shade section 24b to irradiate the region ahead of the vehicle with the right side high beam light distribution pattern (S20). Further, the optical axis adjusting section 58 determines the direction of the right and left optical axes Ax in accordance with the detected position of the preceding vehicle, and swivels the right and left lamp units 30R, 30L accordingly (S22).

If it is determined that there is an oncoming vehicle in S14 (S14; Yes), the vehicle position detecting section 52 determines whether there is a preceding vehicle (S24). If it is determined that there is no preceding vehicle (S24; No), which means that only the oncoming vehicle exists, the shade section position determining section 54 maintains the tilted condition of the right shade section 24a and causes the left shade section 24b to move to the upright position to irradiate the region ahead of the vehicle with the left side high beam light distribution pattern (S26). Further, the optical axis adjusting section 58 determines the direction of the right and left optical axes Ax in accordance with the detected position of the oncoming vehicle, and swivels the right and left lamp units 30R, 30L (S28).

If it is determined that there is a preceding vehicle in S24 (S24; Yes), which means that an oncoming vehicle and a preceding vehicle are detected, the shade section position determining section 54 causes the shade sections 24a, 24b to move to their upright position to irradiate the region in front of the vehicle with the low beam light distribution pattern, even if the high beam is being selected by the driver (S30). In this case, the optical axis adjusting section 58 does not need to change the direction of the optical axes Ax. However, the optical axis adjusting section 58 may adjust one or both of the optical axes Ax of the right and left lamp units 30R, 30L in accordance with a curvature of the lane along which the vehicle is traveling.

Thus, when a forward vehicle is detected based on an image captured by the camera 90 while the high beam is being selected by the driver, one or both of the shade sections 24a, 24b is moved to the upright position in each of the right and left lamp units 30R, 30L to irradiate the region ahead with the left side high beam light distribution pattern, the right side high beam light distribution pattern, or the low beam light distribution pattern, whereby a glare to the driver of the forward vehicle is prevented.

FIGS. 8A to 9C illustrate how the optical axis adjusting section 58 determines the direction of the optical axes Ax of the left lamp unit 30L and the right lamp unit 30R in accordance with the position of the forward vehicle.

Figure 8A:
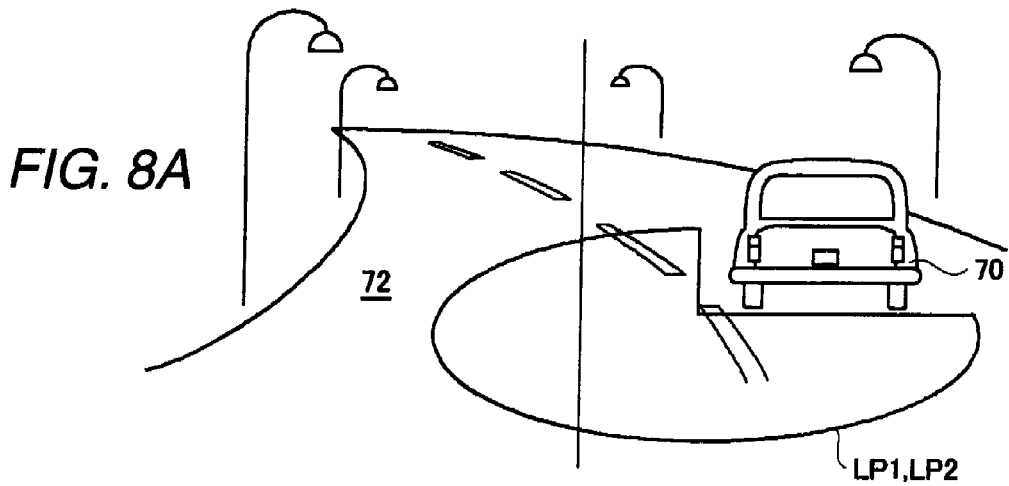
FIGS. 8A to 8C illustrate how directions of optical axes of right and left lamp units are determined in accordance with a position of an oncoming vehicle.
Figure 8B:
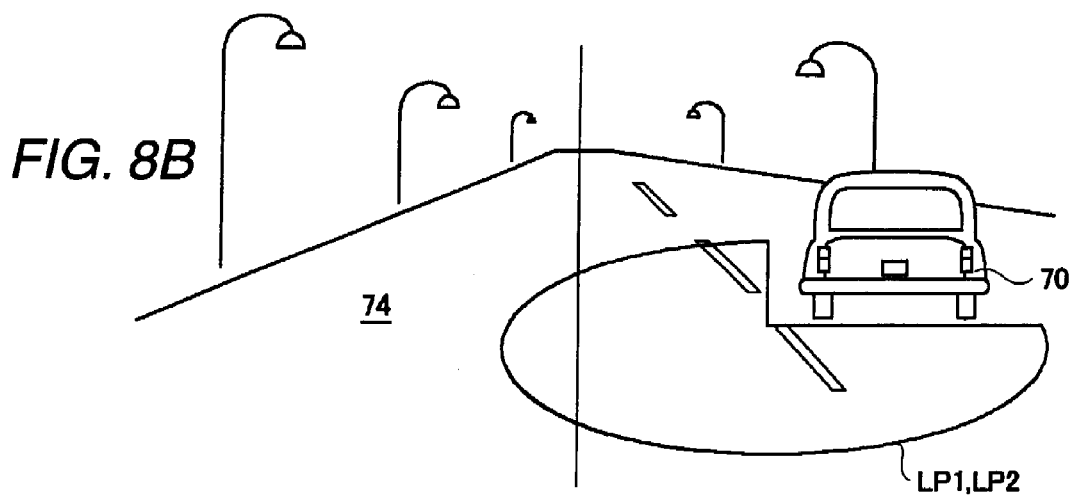
Figure 8C:
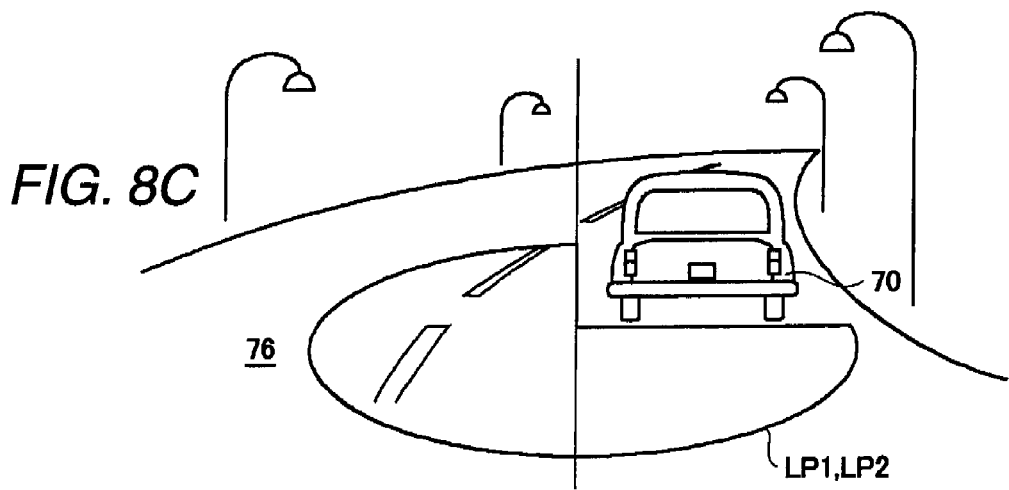

FIGS. 8A to 8C illustrate examples of irradiating a road surface with the left side high beam light distribution pattern LP1 from the left lamp unit 30L and the left side high beam light distribution pattern LP2 from the right lamp unit 30R in a case in which an oncoming vehicle 70 is detected but not a preceding vehicle. FIG. 8A illustrates an example on a left curve road 72, FIG. 8B illustrates an example on a straight road 74, and FIG. 8C illustrates an example on a right curve road 76.

As shown in FIGS. 8A to 8C, the left side high beam light distribution patterns LP1, LP2 are moved by swiveling the optical axes Ax of the right and left lamp units 30R, 30L so as to follow the position of the oncoming vehicle 70. In this example, the left side high beam light distribution pattern LP1 from the left lamp unit 30L and the left side high beam light distribution pattern LP2 from the right lamp unit 30R substantially overlap with each other. The direction of the optical axes Ax is determined such that the vertical cutoff lines LC of the left side high beam light distribution patterns PL1, PL2 are moved away from the left side of the oncoming vehicle 70 by a certain amount. Accordingly, it is possible to broaden the irradiating range of the road surface ahead of the vehicle without giving glare to the driver of the oncoming vehicle 70.

Figure 9A:
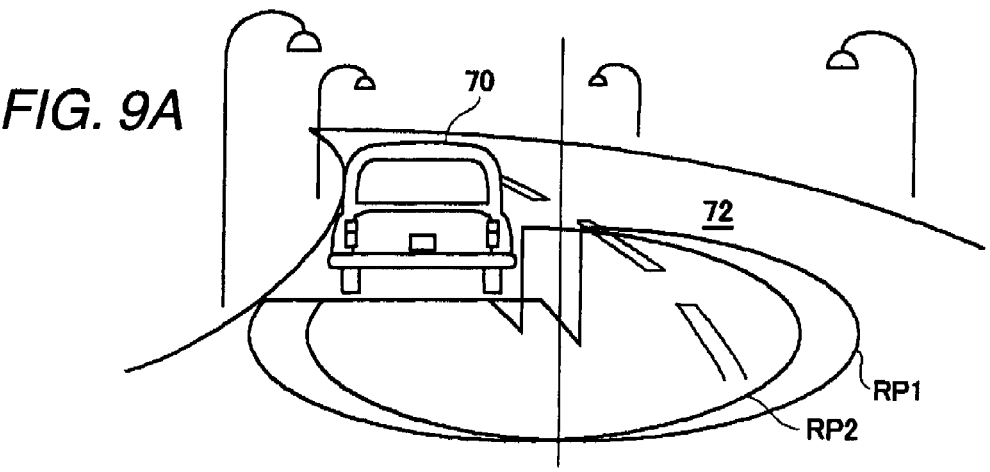
FIGS. 9A to 9C illustrate how the directions of the optical axes of the right and left lamp units are determined in accordance with a position of a preceding vehicle.
Figure 9B:
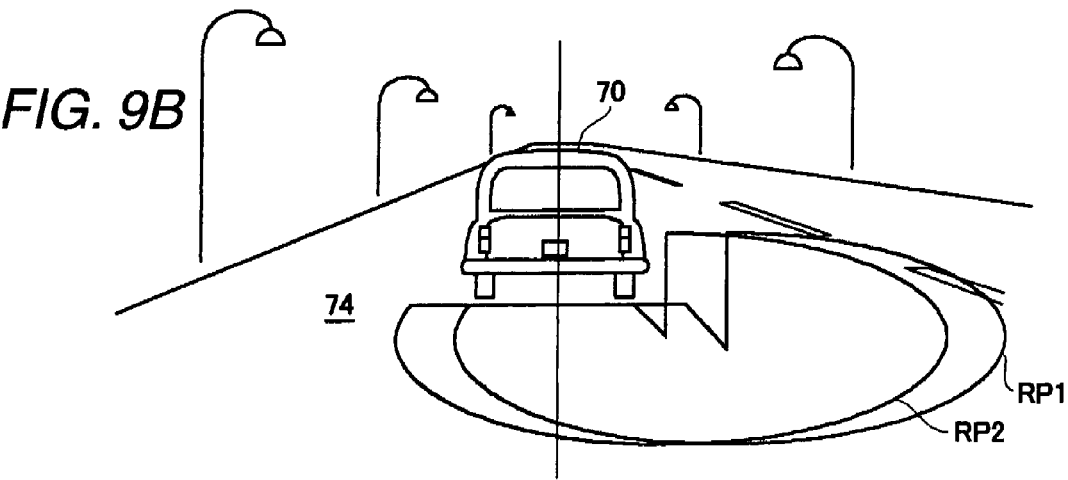
Figure 9C:
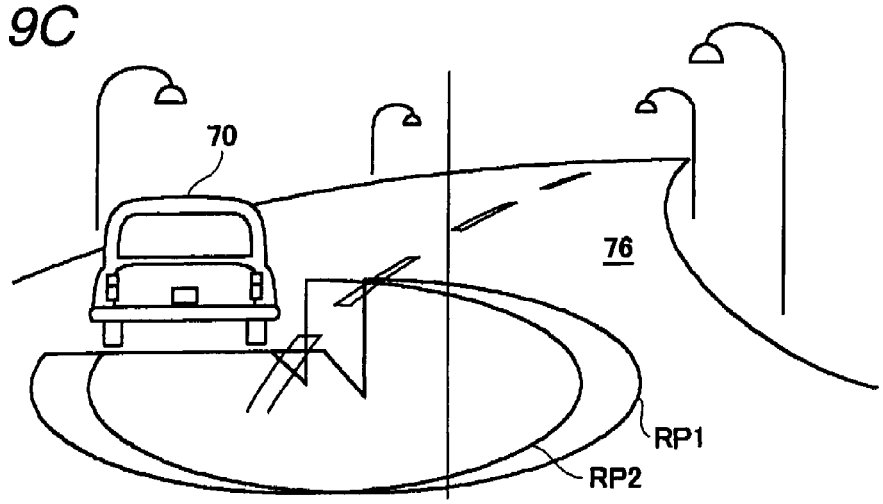

FIGS. 9A to 9C illustrate examples of irradiating a road surface with the right side high beam light distribution pattern RP1 from the left lamp unit 30L and the right side high beam light distribution pattern RP2 from the right lamp unit 30R in a case in which a preceding vehicle 70 is detected but not an oncoming vehicle. FIG. 9A illustrates an example on a left curve road 72, FIG. 9B illustrates an example on a straight road 74, and FIG. 9C illustrates an example on a right curve road 76.

In the examples of using the right side high beam light distribution patterns RP1, RP2 shown in FIGS. 9A to 9C, measures to be taken in order to avoid giving a glare to the driver of the forward vehicle 70 are different from the case of using the left side high beam light distribution patterns LP1, LP2 shown in FIGS. 8A to 8C. That is, irrespective of whether the road is straight or curved, the right side high beam light distribution pattern RP1 from the left lamp unit 30L is swiveled more to the right than the right side high beam light distribution pattern RP2 from the right lamp unit 30R by a certain amount. This amount is determined in advance in consideration of the positional relationship between the right and left lamp units 30R, 30L on the front part of the vehicle body and, thus, varies depending on a type of the vehicle. Because the preceding vehicle 70 is running in the same lane, the right side high beam light distribution pattern RP1 from the left lamp unit 30L is more likely to give a glare to the driver of the preceding vehicle 70 than the right side high beam light distribution pattern RP2 from the right lamp unit 30R (this difference also depends on a distance between the headlamp apparatus 10 and the preceding vehicle 70). Thus, the central axes of the right side high beam light distribution patterns RP1, RP2 are shifted from each other in a transverse direction.

In addition, the swiveling amounts of the right and left lamp units 30R, 30L may be changed in accordance with the distance between the headlamp apparatus 10 and the forward vehicle.

As described above, according to this exemplary embodiment, the headlamp apparatus 10 can produce a low beam light distribution pattern and a high beam light distribution pattern. The shade 24 is divided in to two shade sections 24a, 24b, and each of the shade sections 24a, 24b are independently openable and closable. Accordingly, it is possible to selectively produce one or both of the left side high beam light distribution pattern, which includes a region to the left of the vertical line V-V, and the right side high beam light distribution pattern, which includes a region to the right of the vertical line V-V, above the cutoff line of the low beam light distribution pattern. Therefore, by selecting the left side high beam light distribution pattern or the right side high beam light distribution pattern in accordance with the position of the forward vehicle detected on the basis of the image captured by the camera 90, it is possible to broaden, from the low beam light distribution pattern, the irradiating range of the road surface ahead of the vehicle without giving a glare to the driver of the forward vehicle.

Further, in this exemplary embodiment, both of the right and left lamp units 30R, 30L produce the right side high beam light distribution pattern or the left side high beam light distribution pattern at the same time, and the directions of the optical axes Ax of the right and left lamp units 30R, 30L are swiveled in accordance with the detected position of the forward vehicle. Therefore, it is possible to move the shielded region to an optimal position, irrespective of the curvature of the road or the distance from the headlamp apparatus 10 to the forward vehicle.

Second Exemplary Embodiment

In the first exemplary embodiment, the headlamp apparatus 10 has the lamp units 30R, 30L, each being capable of switching the low beam light distribution pattern and the high beam light distribution pattern. A headlamp apparatus 11 according to a second exemplary embodiment is a four-light headlamp apparatus which has a low beam lamp unit and a high beam lamp unit on each of the right and left parts of a vehicle.

Figure 10:
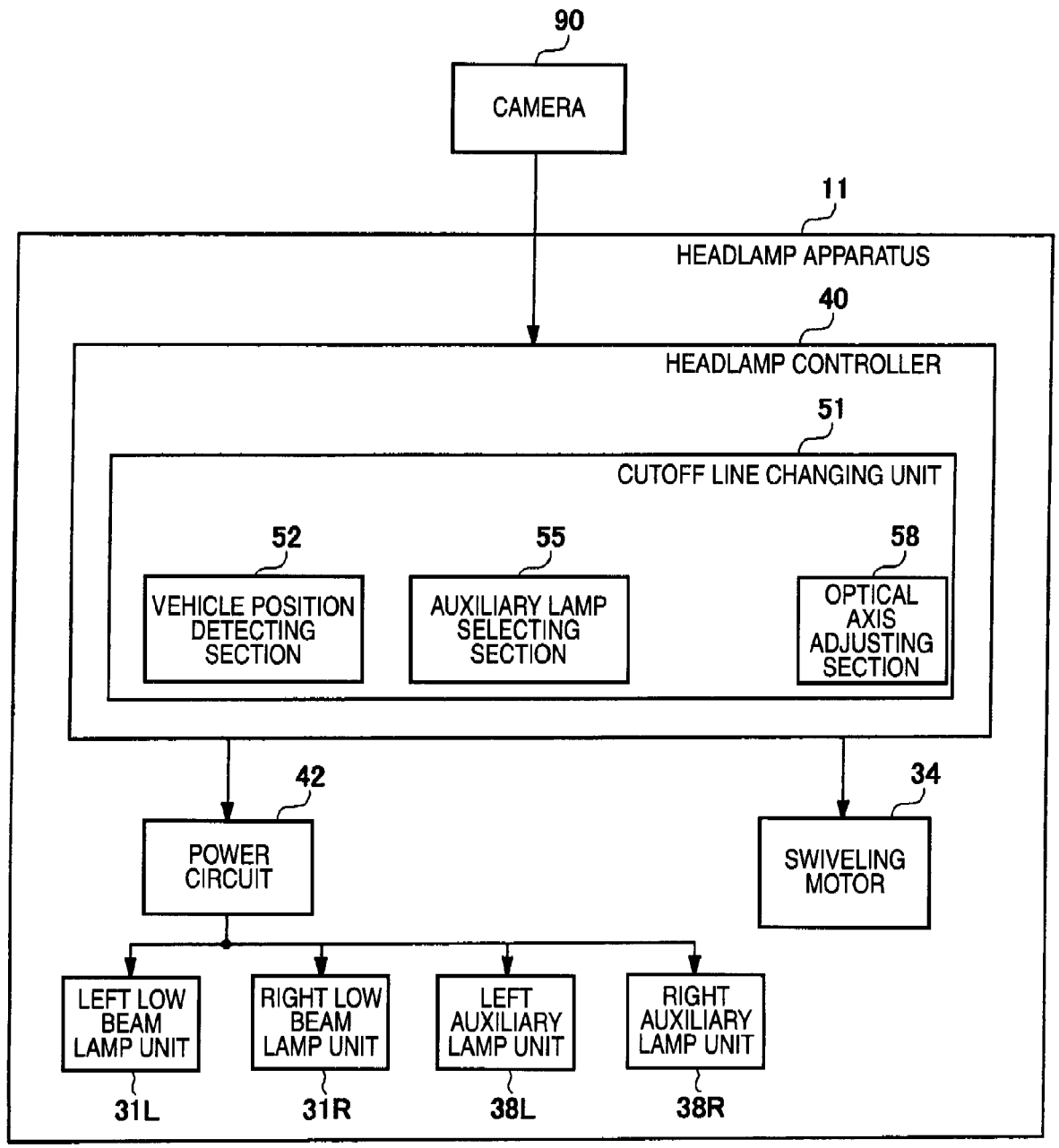
FIG. 10 is a functional block diagram of a headlamp apparatus according to a second exemplary embodiment of the present invention.

FIG. 10 is a functional block diagram of a headlamp apparatus 11 of the second exemplary embodiment. As in the first exemplary embodiment, in the second exemplary embodiment, each of the functional blocks can be implemented by means of hardware, software, or a combination thereof.

The headlamp apparatus 11 includes four lamp units, namely, right and left low beam lamp units 31R, 31L which produce the low beam light distribution pattern respectively, and right and left auxiliary lamp units 38R, 38L which produce the high beam light distribution pattern together with the right and left low beam lamp units 31R, 31L.

Configurations of the left low beam lamp unit 31L and the right low beam lamp unit 31R are basically the same as the configuration of the left lamp unit 30L of the first exemplary embodiment. However, the left low beam lamp unit 31L and the right low beam lamp unit 31R are different from the left lamp unit 30L of the first exemplary embodiment in that the shade 24 is immovable. That is, the left low beam lamp unit 31L and the right low beam lamp unit 31R produce only the low beam light distribution pattern LB (see FIG. 11C).

Each of the right and left auxiliary lamp units 38R, 38L includes an LED or a halogen lamp as a light source. The shade of each of the right and left auxiliary lamp units 38R, 38L is designed to irradiate a region above the horizontal cutoff line of the low beam light distribution pattern. Further, each of the auxiliary lamp units 38R, 38L are respectively provided with a swiveling motor 34 to change an angle of an optical axis thereof.

In the second exemplary embodiment, by combining the low beam light distribution pattern LB produced by the low beam lamp units 31R, 31L and an auxiliary light distribution pattern HR, HL produced by one the auxiliary lamp units 38R, 38L (see FIGS. 11A and 11B), it is possible to form the left side high beam light distribution pattern or the right side high beam light distribution pattern like in the first exemplary embodiment.

The cutoff line changing unit 51 includes the vehicle position detecting section 52, an auxiliary lamp selecting section 55, and the optical axis adjusting section 58.

The vehicle position detecting unit 52 detects a position of a forward vehicle within a range which is to be irradiated with the light distribution pattern, based on an image obtained by the CCD camera 90 which is installed in the vehicle so as to capture an image ahead of the vehicle.

When the vehicle position detecting unit 52 detects a forward vehicle while the high beam is being selected by the driver, the auxiliary lamp selecting section 55 determines which of the auxiliary lamp units 38R, 38L is to be turned on so as to provide a light distribution pattern having a shielded region at the detected position of the vehicle. That is, one of the right side high beam light distribution pattern and the left side high beam light distribution pattern is selected so as to provide a suitable shielded region that does not give a glare to the forward vehicle.

In a case in which an oncoming vehicle is detected by the vehicle position detecting section 52 but not a preceding vehicle, the auxiliary lamp selecting section 55 turns on the left auxiliary lamp unit 38L in addition to the right and left low beam lamp units 31R, 31L to produce the left side high beam light distribution pattern. In a case in which a preceding vehicle is detected by the vehicle position detecting section 52 but not an oncoming vehicle, the auxiliary lamp selecting section 55 turns on the right auxiliary lamp unit 38R in addition to the right and left low beam lamp units 31R, 31L to produce the right side high beam light distribution pattern.

The optical axis adjusting section 58 determines the directions of the optical axes of the right and left low beam lamp units 31R, 31L and the right and left auxiliary lamp units 38R, 38L, based the position of the forward vehicle detected by the vehicle position detecting section 52. More specifically, when there is a forward vehicle, the optical axis adjusting section 58 adjusts the directions of the respective optical axes Ax such that the vertical cutoff line RC, LC of the right side high beam light distribution pattern or the left side high beam light distribution pattern is located slightly on an outer side of the forward vehicle. Further, the optical axis adjusting section 58 determines the swivel angles of the respective lamp units so that the optical axes of the right and left low beam lamp units 31R, 31L and the right and left auxiliary lamp units 38R, 38L are directed to the determined directions, and sends the driving signals to the swiveling motors 34 in accordance with the swivel angles.

Figure 11A:
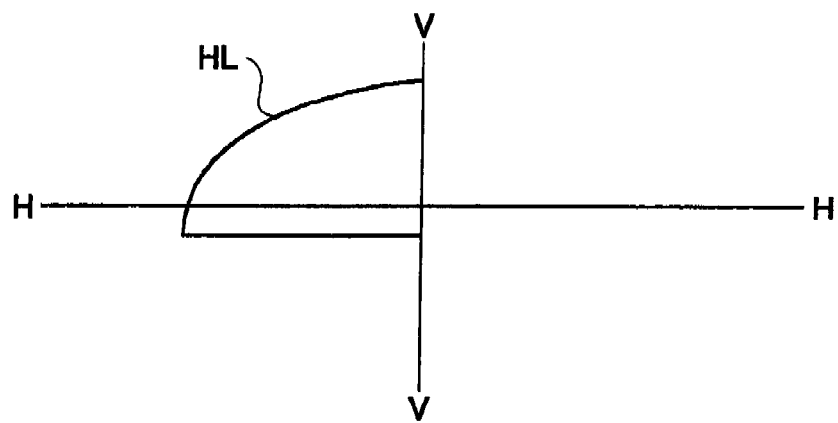
FIGS. 11A to 11C illustrate light distribution patterns which are produced by respective lamp units whose optical axes are not swiveled.
Figure 11B:
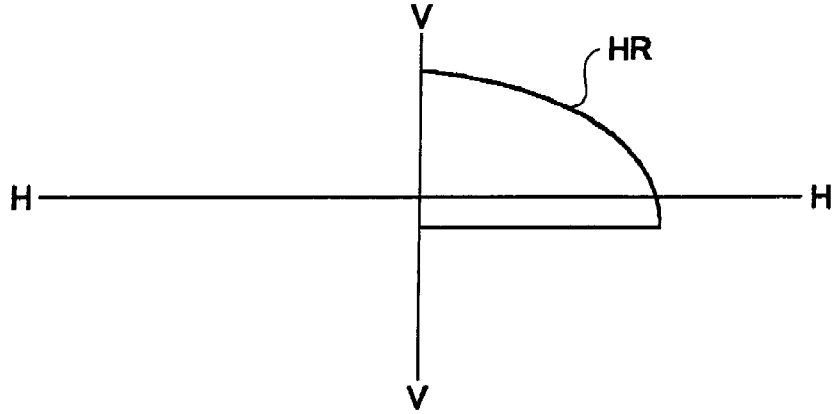
Figure 11C:
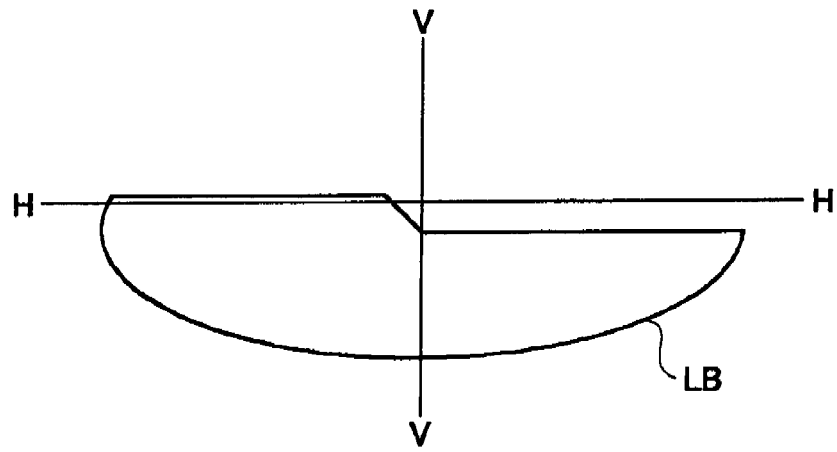

FIGS. 11A to 11C illustrate light distribution patterns produced by the respective lamp units in a state in which the optical axes are not swiveled. FIG. 11A illustrates the left side auxiliary light distribution pattern HL produced by the left auxiliary lamp unit 38L. As shown in FIG. 11A, the shade of the left auxiliary lamp unit 38L is configured such that the lower side of the left side light distribution pattern HL is located slightly below the horizontal line H-H and such that the right side (the vertical cutoff line) of the left side light distribution pattern HL is aligned with the vertical line V-V FIG. 11B illustrates the right side auxiliary light distribution pattern HR produced by the right auxiliary lamp unit 38R. As shown in FIG. 11B, the shade of the right auxiliary lamp unit 38R is configured such that the lower side of the right side auxiliary light distribution pattern HR is located slightly below the horizontal line H-H and such that the left side (the vertical cutoff line) of the right side auxiliary light distribution pattern HR is aligned with the vertical line V-V FIG. 11C illustrates the low beam light distribution pattern LB produced by the left low beam lamp unit 31L and the right low beam lamp unit 31R. The low beam light distribution pattern LB is the same as the low beam light distribution pattern produced by the shade 24 of the first exemplary embodiment.

Figure 12A:
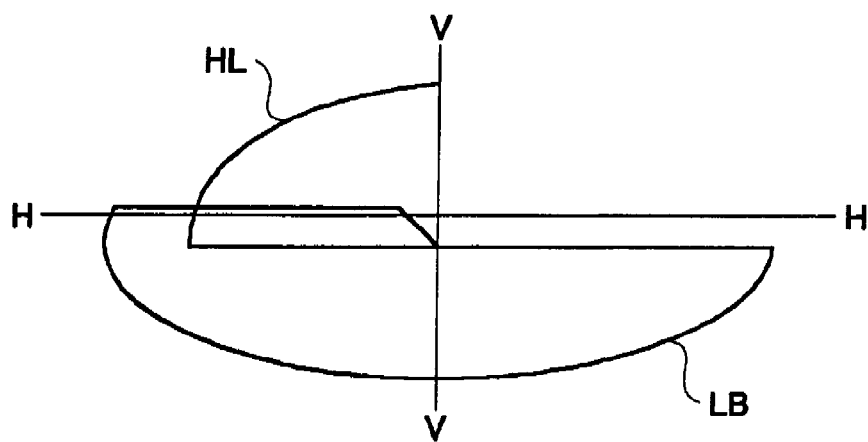
FIGS. 12A to 12B illustrate combined light distribution patterns which are formed by combining a low beam light distribution pattern and an auxiliary light distribution pattern.
Figure 12B:
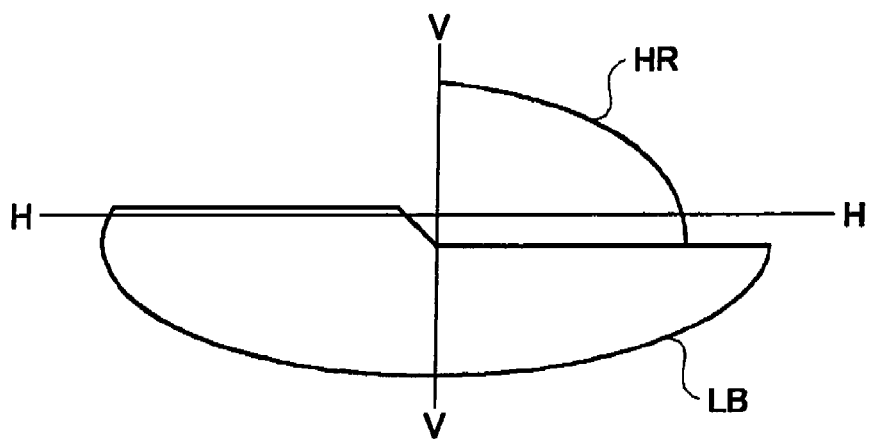

FIGS. 12A and 12B illustrate combined light distribution patterns formed by combining the low beam light distribution pattern and the auxiliary light distribution pattern.

FIG. 12A illustrates a combined light distribution pattern which is formed by combining the low beam light distribution pattern LB produced by the low beam lamps 31R, 31L and the left side auxiliary light distribution pattern HL produced by the left auxiliary lamp unit 38L. This combined light distribution pattern corresponds to the left side high beam light distribution pattern of the first exemplary embodiment. That is, in a case in which only an oncoming vehicle is detected, the road surface is irradiated with this combined light distribution pattern.

FIG. 12B illustrates a combined light distribution pattern which is formed by combining the low beam light distribution pattern LB produced by the low beam lamp units 31R, 31L and the right side auxiliary light distribution pattern HR produced by the right auxiliary lamp unit 38R. This combined light distribution pattern corresponds to the right side high beam light distribution pattern of the first exemplary embodiment. That is, in a case in which only a preceding vehicle is detected, the road surface is irradiated with this combined light distribution pattern.

Regarding the combined light distribution patterns shown in FIGS. 12A and 12B, the low beam light distribution pattern LB is produced by both of the right and left low beam lamp units 31R, 31L, while the auxiliary light distribution pattern HR, HL is produced by one of the right auxiliary lamp unit 38R or the left auxiliary lamp unit 38L. Accordingly, it is to be noted that the illuminance of the low beam light distribution pattern LB is about twice as high on average than the illuminance of the auxiliary light distribution pattern HR, HR, if the lighting intensity of the respective lamp units is the same. Therefore, in order to avoid an extreme variation of the illuminance in the combined light distribution pattern, the lighting intensity of the light source of the auxiliary lamp units 38R, 38L is configured to be larger than that of the low beam lamp units 31R, 31L.

As described above, according to the second exemplary embodiment, it is possible to broaden the irradiating range in the road surface ahead of the vehicle without giving a glare to the driver of the forward vehicle by additionally providing the auxiliary lamp units 38R, 38L to separately produce the auxiliary light distribution patterns HR, HL. Therefore, it is not necessary to provide a complex mechanism for independently moving the shade sections in the lamp unit.

It is to be noted that features of the exemplary embodiments described above may be combined.

While the present invention has been shown and described with reference to certain exemplary embodiments thereof, it will be understood by those skilled in the art that various changes in form and details may be made therein without departing from the spirit and scope of the present invention as defined by the appended claims.

For example, in the first exemplary embodiment, the left side high beam light distribution pattern LP is produced by both of the right and left lamp units 30R, 30L at the same time or the right side high beam light distribution pattern RP is produced by both of the right and left lamp units 30R, 30L at the same time, depending on the position of the forward vehicle detected by the vehicle position detecting unit 52.

However, the right and left lamp units 30R, 30L may produce different light distribution patterns at the same time.

Figure 13A:
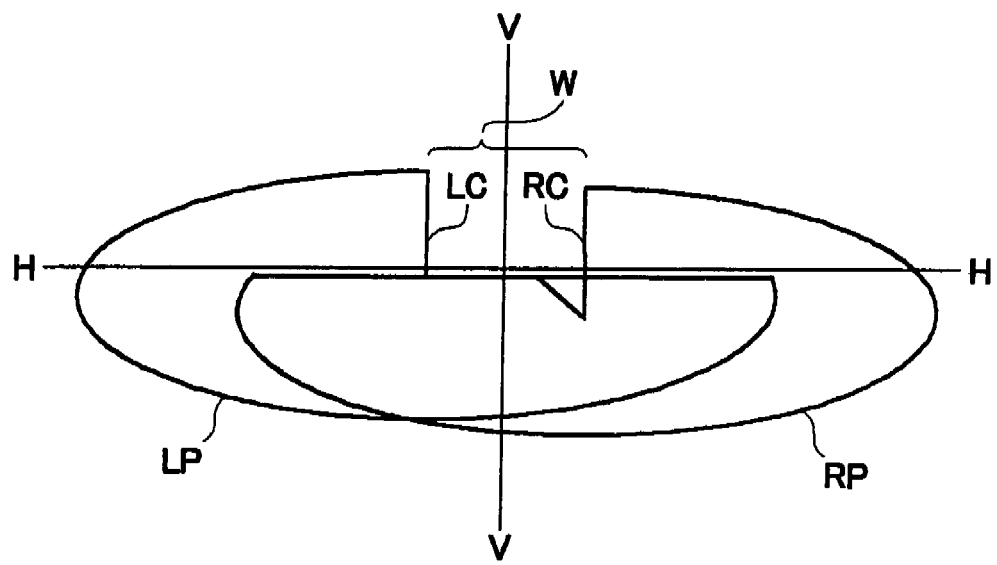
FIGS. 13A and 13B illustrate combined light distribution patterns which are formed by combining a left side high beam light distribution pattern produced by a left headlamp and a right side high beam light distribution pattern produced by a right headlamp.

FIG. 13A illustrates a combined light distribution pattern projected on the virtual vertical screen in a case in which the left side high beam light distribution pattern LP is produced by the left lamp unit 30L and the right side high beam light distribution pattern RP is produced by the right lamp unit 30R. The swivel angles of the right and left lamp units 30R, 30L are adjusted such that a height of a horizontal portion of the left side high beam light distribution pattern LP is equal to a height of a horizontal portion of the right side high beam light distribution pattern RP, and a non-irradiated region W is provided between the vertical cutoff line LC of the left side high beam light distribution pattern LP and the vertical cutoff line RC of the right side high beam light distribution pattern RP. Accordingly, an irradiating region of this combined light distribution pattern has a recessed portion. By adjusting the swivel angles of the right and left lamp units 30R, 30L so as to maintain the combined light distribution pattern to have such a recessed portion, it is possible to cope with various situations.

For example, it is possible to change a width of the non-irradiated region W in accordance with a width of the forward vehicle detected by the vehicle position detecting unit 52. More specifically, the swivel angles of the right and left lamp units 30R, 30L may be adjusted independently so as to reduce the width of the non-irradiated region W when the forward vehicle is located at a distant region and to increase the width of the non-irradiated region W when the forward vehicle is located at a near region. By changing the width of the non-irradiated region W in this manner, it is possible to broaden the irradiating range in the road surface ahead of the vehicle as much as possible with a minimum non-irradiated region for preventing a glare to the driver of the forward vehicle.

In another example, when the vehicle is approaching the left curve while the oncoming vehicle is being detected, the left side high beam light distribution pattern LP may be moved to the inner side (i.e., to the left) of the curve. Likewise, when the vehicle is approaching the right curve while the preceding vehicle is being detected, the right side high beam light distribution pattern RP may moved to the inner side (i.e., to the right) of the curve. This allows irradiating the inner side of the curve with the high beam without giving a glare to the forward vehicle.

Of course, a combined light distribution pattern having a recessed portion like the one shown in FIG. 13A may be formed by combining the right side high beam light distribution pattern RP produced by the left lamp unit 30L and the left side high beam light distribution pattern LP produced by the right lamp unit 30R.

Further, by tuning on the right and left auxiliary lamps 38R, 38L of the second exemplary embodiment and by adjusting the swivel angles of the right and left auxiliary lamps 38R, 38L, it is also possible to form a recessed combined light distribution pattern having a non-irradiated region at the center as shown in FIG. 13A.

As described above, a recessed combined light distribution pattern having a non-irradiated region at the center may be formed by the combining the right side high beam light distribution pattern and the left side high beam light distribution pattern, thereby irradiating a region ahead with the high beam without giving a glare to the forward vehicle in various situation in which, for example, the distance from the headlamp apparatus 10, 11 to the forward vehicle and/or the topography of the road vanes.

Figure 13B:
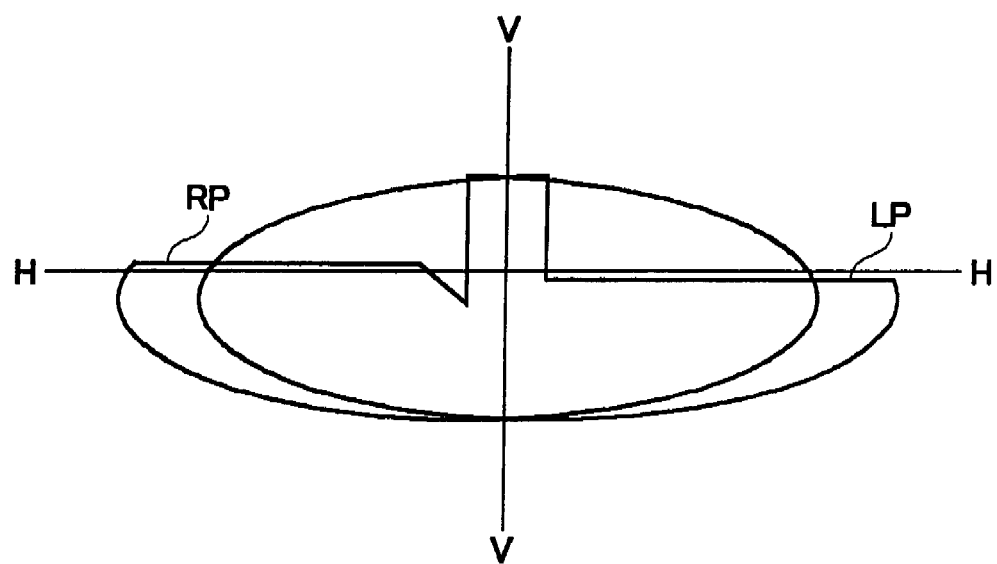

Furthermore, as shown in FIG. 13B, the swivel angles of the right and left lamp units 30R, 30L may be adjusted such that portions of the right side high beam light distribution pattern RP and the left side high beam light distribution pattern LP overlap with each other above the horizontal line H-H, thereby improving a distant visibility while the forward vehicle is not being detected.

Moreover, while the exemplary embodiments have been described under the assumption that the headlamp apparatus 10, 11 is used under the left-hand traffic system, it will be understood by those skilled in the art that the headlamp apparatus 10, 11 can be modified so as to be suitable for the right-hand traffic system.

Accordingly, these and other changes and modifications are included within the scope of the present invention as defined by the appended claims.

What is claimed is:

1. A vehicle headlamp apparatus comprising:
   a right headlamp;
   a left headlamp; and
   a controller which controls the right and left headlamps,
   wherein each of the right and left headlamps is configured to produce a low beam light distribution pattern having a horizontal cutoff line to irradiate a region in front of the vehicle headlamp apparatus, and is operable to selectively produce one or both of a right side auxiliary light distribution pattern above a right part of the horizontal cutoff line and a left side auxiliary light distribution pattern above a left part of the horizontal cutoff line,
   the controller comprises a vehicle position detecting section which detects a position of a forward vehicle ahead of the vehicle headlamp apparatus, and
   the controller is configured to control, based on the position of the forward vehicle detected by the vehicle position detecting section, each of the right and left headlamps to produce one or both of the right side auxiliary light distribution pattern and the left side auxiliary light distribution pattern.

2. The headlamp apparatus according to claim 1, wherein each of the right and left headlamps comprises a lamp unit comprising:
   a light source; and
   a shade which shields a part of light emitted from the light source to produce the low beam light distribution pattern,
      wherein the shade comprises a plurality of shade sections, and
      the controller controls each of the right and left headlamps to move one or more of the shade sections to produce one or both of the right side auxiliary light distribution pattern and the left side auxiliary light distribution pattern.

3. The headlamp apparatus according to claim 2, wherein, in each of the right and left headlamps, the plurality of shade sections comprises two shade sections that overlap with each other when viewed from a direction of an optical axis of the lamp unit.

4. The headlamp apparatus according to claim 2, wherein each of the right and left headlamps further comprises a swiveling motor which swivels the lamp unit in a horizontal direction,
   wherein, based on the position of the forward vehicle, the controller controls one or both of the right and left headlamps to drive the swiveling motor to move one or both of the right side auxiliary light distribution pattern and the left side auxiliary light distribution pattern in the horizontal direction.

5. The headlamp apparatus according to claim 4, wherein, based on the position of the forward vehicle, the controller controls one of the right and left headlamps to produce one of the right side auxiliary light distribution pattern and the left side auxiliary light distribution pattern and the other of the right and left headlamps to produce the other of the right side auxiliary light distribution pattern and the left side auxiliary light distribution pattern, and further controls at least one of the right and left headlamps to drive the swiveling motor to create a non-irradiated region at the position of the forward vehicle and between the right side auxiliary light distribution pattern and the left side auxiliary light distribution pattern.

6. The headlamp apparatus according to claim 1, wherein each of the right and left headlamps comprises:
   a low beam lamp unit which produces the low beam light distribution pattern; and
   an auxiliary lamp unit which produces one of the right side auxiliary light distribution pattern and the left side auxiliary light distribution pattern,
   wherein, based on the position of the forward vehicle, the controller controls one or both of the right and left headlamps to turn on the auxiliary lamp unit.

7. The headlamp apparatus according to claim 6, wherein each of the right and left headlamps further comprises a swiveling motor which swivels the auxiliary lamp unit in a horizontal direction,
   wherein, based on the position of the forward vehicle, the controller controls one or both of the right and left headlamps to drive the swiveling motor to move one or both of the right side auxiliary light distribution pattern and the left side auxiliary light distribution pattern in the horizontal direction.

8. The headlamp apparatus according to claim 7, wherein, based on the position of the forward vehicle, the controller controls one of the right and left headlamps to turn on the auxiliary lamp unit to produce one of the right side auxiliary light distribution pattern and the left side auxiliary light distribution pattern and the other of the right and left headlamps to turn on the auxiliary lamp unit to produce the other of the right side auxiliary light distribution pattern and the left side auxiliary light distribution pattern, and further controls at least one of the right and left headlamps to drive the swiveling motor to create a non-irradiated region at the position of the forward vehicle and between the right side auxiliary light distribution pattern and the left side auxiliary light distribution pattern.

9. The headlamp apparatus according to claim 1, wherein, based on the position of the forward vehicle, the controller determines whether the forward vehicle is an oncoming vehicle or a preceding vehicle,
   wherein, if the controller determines that the forward vehicle is the oncoming vehicle, the controller controls the right and left headlamps individually to produce one of the right side auxiliary light distribution pattern and the left side auxiliary light distribution pattern, and
   if the controller determines that the forward vehicle is the preceding vehicle, the controller controls the right and left headlamps individually to produce the other of the right side auxiliary light distribution pattern and the left side auxiliary light distribution pattern.

10. The headlamp apparatus according to claim 1, wherein an outer edge of each of the right side auxiliary light distribution pattern and the left side auxiliary light distribution pattern comprises a vertical cutoff line.

11. The vehicle headlamp apparatus according to claim 10, wherein the right side auxiliary light distribution pattern is not disposed on a left side of the vertical cutoff line of the right side auxiliary light distribution pattern, and the left side auxiliary light distribution pattern is not disposed on a right side of the vertical cutoff line of the left side auxiliary light distribution pattern.

12. The headlamp apparatus according to claim 1, wherein a high beam light distribution pattern is produced by combining the low beam light distribution pattern, the right side auxiliary light distribution pattern, and the left side auxiliary light distribution pattern.

13. A vehicle headlamp apparatus comprising:
   a right lamp unit comprising a right lamp light source; a first shade section, and a second shade section, each shade section shielding a part of light emitted from the right lamp light source;
   a left lamp unit comprising a left lamp light source; a first shade section; and a second shade section, each shade section shielding a part of light emitted from the left lamp light source; and
   a controller configured to control, based on a vehicle position of a forward vehicle ahead of the vehicle lamp apparatus, each of the right lamp unit and the left lamp unit such that the controller individually controls the first shade section and the second shade section of the right lamp unit and individually controls the first shade section and the second shade section of the left lamp unit.

14. The vehicle headlamp apparatus according to claim 13, wherein
   each of the shade sections of the right headlamp is independently rotatable between an upright position and a tilted down position,
   each of the shade sections of the left headlamp is independently rotatable between an upright position and a tilted down position, and
   based on the vehicle position, the controller controls the first shade section and the second shade section of the right lamp unit to rotate to one of an upright-upright, upright-tilted down, tilted down-upright and tilted down-tilted down position, and the controller controls the first shade section and the second shade section of the left lamp unit to rotate to one of an upright-upright, upright-tilted down, tilted down-upright and tilted down-tilted down position.

15. The vehicle headlamp apparatus according to claim 14, further comprising a swivel motor which swivels the right lamp unit and another swivel motor which swivels the left lamp unit, and
   based on the vehicle position, the controller controls the swivel motors to independently swivel the right lamp unit and the left lamp unit respectively.

16. The vehicle headlamp apparatus according to claim 13, wherein each of the shade sections of the right lamp unit is independently rotatable between an upright position and a tilted down position, and
   each of the shade sections of the left lamp unit is independently rotatable between an upright position and a tilted down position.

17. The headlamp apparatus according to claim 13, wherein, in each of the right and left lamp units, the first shade section and the second shade section overlap each other when viewed from a direction of an optical axis of the lamp unit.

* * * * *